(12) United States Patent
Grosch et al.

(10) Patent No.: US 8,399,608 B2
(45) Date of Patent: Mar. 19, 2013

(54) PROCESS FOR THE PREPARATION OF POLYETHER ALCOHOLS FROM UNSATURATED STARTERS HAVING ACTIVE HYDROGEN ATOMS

(75) Inventors: Georg Heinrich Grosch, Bad Duerkheim (DE); Matthias Zipplies, Neustadt (DE); Thomas Ostrowski, Mannheim (DE); Ulrich Annen, Hassloch (DE); Markus Klumpe, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 288 days.

(21) Appl. No.: 12/681,789

(22) PCT Filed: Oct. 25, 2007

(86) PCT No.: PCT/EP2007/061489
§ 371 (c)(1),
(2), (4) Date: Apr. 6, 2010

(87) PCT Pub. No.: WO2009/052864
PCT Pub. Date: Apr. 30, 2009

(65) Prior Publication Data
US 2010/0216968 A1 Aug. 26, 2010

(51) Int. Cl.
C08G 65/10 (2006.01)
C08G 65/30 (2006.01)
C08G 65/34 (2006.01)
C08F 8/06 (2006.01)
C08F 6/08 (2006.01)

(52) U.S. Cl. ........ 528/489; 528/392; 528/393; 528/403; 528/488; 528/495; 528/425; 528/503

(58) Field of Classification Search .................. 528/393, 528/392, 403, 425, 488, 489, 495, 503
See application file for complete search history.

(56) References Cited

U.S. PATENT DOCUMENTS

| 5,798,425 A | 8/1998 | Albrecht et al. |
| 5,912,284 A | 6/1999 | Hirata et al. |
| 6,391,923 B1 | 5/2002 | Pollmann et al. |
| 2006/0223979 A1 | 10/2006 | Ostrowski et al. |
| 2008/0214778 A1 | 9/2008 | Herwig et al. |
| 2009/0203874 A1 | 8/2009 | Loeffler et al. |
| 2009/0292147 A1 | 11/2009 | Ostrowski et al. |

FOREIGN PATENT DOCUMENTS

| EP | 0 736 553 | 10/1996 |
| EP | 0 850 894 | 7/1998 |
| EP | 1 069 139 | 1/2001 |
| JP | 2003-342363 | 12/2003 |
| WO | WO 2006/106056 A1 | 10/2006 |
| WO | WO 2007/009905 A1 | 1/2007 |
| WO | WO 2007/135154 A1 | 11/2007 |
| WO | WO 2007/147780 A1 | 12/2007 |

*Primary Examiner* — Duc Truong
(74) *Attorney, Agent, or Firm* — Oblon, Spivak, McClelland, Maier & Neustadt, L.L.P.

(57) ABSTRACT

A process for the preparation of polyether alcohols by reacting at least one alkylene oxide with at least one unsaturated starter having at least one active hydrogen atom per molecule under basic catalysis,
that the alkoxylation is carried out in at least two stages,
in stage (I) the alkoxylation of the starter or starters being carried out with not more than 10 mol of alkylene oxide per mole of starter with a catalyst concentration of not more than 0.0085 mol of basic catalyst per mole and
in stage (II) and the optionally following stages, the alkoxylated starter or starters from stage (I) being reacted with further alkylene oxide at a catalyst concentration of at least 0.01 mol of basic catalyst per mole of starter.

20 Claims, No Drawings

PROCESS FOR THE PREPARATION OF POLYETHER ALCOHOLS FROM UNSATURATED STARTERS HAVING ACTIVE HYDROGEN ATOMS

CROSS REFERENCE TO RELATED APPLICATIONS

The present application is the national stage of international application PCT/EP2007/061489, filed on Oct. 25, 2007.

The present invention relates to a process for the preparation of polyether alcohols by reacting at least one alkylene oxide with at least one unsaturated starter having at least one active hydrogen atom per molecule under basic catalysis, wherein the alkoxylation is carried out in at least two stages, in stage (I) the alkoxylation of the starter or starters being carried out with not more than 10 mol of alkylene oxide per mole of starter with a catalyst concentration of not more than 0.0085 mol of basic catalyst per mole and in stage (II) and the optionally following stages, the alkoxylated starter or starters from stage (I) being reacted with further alkylene oxide at a catalyst concentration of at least 0.01 mol of basic catalyst per mole of starter.

Alkoxylated alcohols have a variety of uses, for example as emulsifiers and as, or for the preparation of, flow improvers of construction materials, such as, for example, concrete. They are usually prepared by alkoxylation of alcohols.

EP 1,069,139 describes not only the preparation and use of aqueous polymer dispersions but also the preparation of allyl or vinyl ether alcohol alkoxylates by reacting allyl or vinyl ether alcohols (e.g. 4-hydroxybutyl vinyl ether) under basic catalysis (sodium methanolate as a catalyst) with alkylene oxide (ethylene oxide and/or propylene oxide). The reaction of the 4-hydroxybutyl vinyl ether with alkylene oxide takes place in one stage after addition of 0.2 mol of sodium methanolate solution as a catalyst.

DE 100,20,670 describes polyalkylene glycol-modified organosiloxanyl derivatives which are obtained by reacting organosiloxanes with vinyl ether alkoxylates. Such vinyl ether alkoxylates are likewise prepared by alkoxylation of vinyl ether alcohols (hydroxybutyl vinyl ether) under basic catalyst (0.2 mol of sodium methanolate solution).

In the documents cited, it is stated that the unsaturated starter is initially taken for the reaction with the alkylene oxide with a relatively high concentration of basic catalyst (0.459 mol of sodium methanolate solution per mole of vinyl ether alcohol).

High concentrations of basic catalyst lead to a high reaction rate of the alkylene oxide with the starter, which is very desirable because of the space-time yield and hence the cost-efficiency of the process.

Dynamic differential calorimetry measurements on mixtures of sensitive starters, such as, in particular, allyl or vinyl ether alcohols, with basic catalysts, for example sodium or potassium hydroxide or methanolate, however, show that, at relatively high catalyst concentrations (greater than 0.07 mol of basic catalyst per mole of starter alcohol), these mixtures of allyl or vinyl ether alcohols with the basic catalysts exhibit secondary reactions at onset temperatures as low as from 150 to 170° C., which secondary reactions are so exothermic that they lead to uncontrollable conditions in the reactor.

In the context of the present invention, onset temperatures are understood as meaning those temperatures at which dangerous exothermic reactions (greater than 200 kJ/kg) start to occur. Onset temperatures can advantageously be determined by differential calorimetry (DSC), for example by dynamic differential calorimetry. Since onset temperatures determined in this manner have a dependency on the heating rate of the dynamic differential calorimetry, said onset temperatures are always based on a heating rate of 2.5 K/min (or 2.5° C./min).

This finding was all the more surprising since vinyl ether alcohols are as a rule stabilized with bases (e.g. KOH) and the pure vinyl ether alcohols stabilized with bases exhibit these secondary reactions in the case of dynamic differential calorimetry measurements as a rule only from 320 to 350° C.

In order to ensure the safety of an alkoxylation plant, the latter should be operated in such a way that the maximum temperature achievable by the reaction procedure, which may be present for some time in the extreme case, is about 100° C. lower than the lowest onset temperature of an exothermic secondary reaction.

In order to be able to operate an alkoxylation plant safely and at the same time economically, the onset temperature of the secondary reaction should not fall below 290° C.

It was therefore the object to find a process for the reaction of unsaturated compounds which have at least one active hydrogen atom per molecule with alkylene oxides under basic catalysis which is economical, i.e. permits high space-time yields, and ensures the safety of the production plant.

One possible solution for permitting the alkoxylation of such sensitive starters would be to equip the alkoxylation plants with extensive safety measures, such as, for example, quench containers. A quench container is as a rule a large pressure-resistant container whose volume is a multiple of the batch to be produced and which is always filled to a certain percentage with water or another liquid. If the temperature in the reactor reaches a value within the 100 K zone of the onset temperature during an alkoxylation, the reactor content is forced in a very short time by the safety system into the quench container and the undesired reaction is thus stopped. The installation of quench containers is, however, associated with high capital costs and is also not always possible in existing plants owing to space limitations. Such additional safety measures are as a rule therefore very expensive.

The object could be achieved by the process defined at the outset.

Investigations show that the onset temperatures for the dangerous exothermic base-catalyzed secondary reactions of the unsaturated starters have a dependency on the concentration of the basic catalyst in the starter.

In the process according to the invention for the preparation of polyether alcohols by reacting at least one alkylene oxide with at least one unsaturated starter having at least one active hydrogen atom per molecule under basic catalysis, a procedure is adopted in which the alkoxylation is carried out in at least two stages, for example from two to four stages, in particular two stages, in stage (I) the alkoxylation of the starter or starters being carried out with not more than 10 mol of alkylene oxide per mole of starter with a catalyst concentration of not more than 0.0085 mol of basic catalyst per mole, and in stage (II) and the optionally following stages, the alkoxylated starter or starters from stage (I) being reacted with further alkylene oxide at a catalyst concentration of at least 0.01 mol of basic catalyst per mole of starter.

In one embodiment of the present invention, starters are understood as meaning ethylenically unsaturated molecules having at least one active hydrogen atom per molecule, in particular amines and alcohols having at least one ethylenic double bond per molecule. Starters are preferably chosen from ether amines and ether alcohols having at least one ethylenic double bond per molecule, for example from ether alcohols of the general formula I

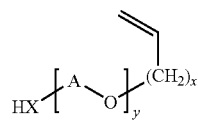

in which the variables are defined as follows:

X is N—H or preferably oxygen, x is an integer in the range from zero to four, preferably zero or one, y is zero or one, either x or y not being equal to zero or neither x nor y being equal to zero, A is selected from $C_2$-$C_{10}$-alkylene groups, branched or preferably linear, for example $CH(CH_3)$—$CH_2$, $[CH(CH_3)]_2$, preferably $(CH_2)_2$, $(CH_2)_3$, $(CH_2)_4$, $(CH_2)_5$, $(CH_2)_6$, $(CH_2)_7$, $(CH_2)_8$, $(CH_2)_9$, $(CH_2)_{10}$, in particular linear $C_2$-$C_6$-alkylene, such as $(CH_2)_2$, $(CH_2)_3$, $(CH_2)_4$, $(CH_2)_5$, $(CH_2)_6$, and (poly) alkylene oxides, in particular polyethylene oxides, for example $(OH_2)_2$—O—$(OH_2)_2$, $[(CH_2)_2$—O$]_2$—$(CH_2)_2$, $[(CH_2)_2$—O$]_3$—$(CH_2)_2$, $[(CH_2)_2$—O$]_4$—$(CH_2)_2$.

Examples of preferred compounds of the formula I are allyl alcohol, 2-hydroxyethyl vinyl ether, 3-hydroxypropyl vinyl ether, 4-hydroxybutyl vinyl ether, 5-hydroxypentyl vinyl ether, 6-hydroxyhexyl vinyl ether, diethylene glycol monovinyl ether, triethylene glycol monovinyl ether, 3-aminopropyl vinyl ether or mixtures thereof.

In one embodiment of the present invention, starters are selected from allyl ether alcohols or preferably vinyl ether alcohols. 4-Hydroxybutyl vinyl ether is very particularly preferred.

In one embodiment of the present invention, a plurality of starters which are preferably in each case compounds of the general formula I is used. However, it is preferable to carry out the process according to the invention with only one starter.

In another embodiment of the present invention, a mixture which comprises at least 10% by weight of at least one compound of the general formula I and furthermore up to 90% by weight of an alcohol or an amine without an ethylenic double bond, for example a $C_1$-$C_{10}$-alkanol or a $C_1$-$C_{10}$-amine, is used as starter.

In the context of the present invention, alkylene oxides used are one or more $C_2$-$C_{10}$-alkylene oxides. Butylene oxide and in particular ethylene oxide or propylene oxide can preferably be used as the alkylene oxide, and furthermore mixtures of ethylene oxide with propylene oxide and/or butylene oxide are preferred.

When a plurality of alkylene oxides is used, the alkylene oxides can be polymerized onto the starter as a block or in random distribution, depending on the variant for carrying out the process according to the invention.

In one embodiment of the present invention, the same alkylene oxide is used for stage (I) of the process according to the invention as for stage (II) and optionally following stages. In another embodiment of the present invention, a different alkylene oxide or mixture of alkylene oxides is used for stage (II) and optionally following stages of the process according to the invention from that for stage (I) of the process according to the invention.

The process according to the invention is carried out in the presence of a basic catalyst. Basic alkaline earth metal compounds and in particular basic alkali metal compounds, for example alkaline earth metal oxides, alkali metal carbonates, alkaline earth metal hydroxides, alkali metal hydroxides, alkaline earth metal alcoholates and alkali metal alcoholates, in particular alkali metal $C_1$-$C_4$-alkanolates, are suitable.

Hydroxides, oxides and alcoholates of sodium, potassium, rubidium and cesium as well as calcium and magnesium are preferred.

Hydroxides and alcoholates of sodium and potassium are particularly preferred. Among the alcoholates, the methanolates are preferred. Sodium hydroxide, potassium hydroxide, sodium methanolate and potassium methanolate are particularly preferred. Mixtures of two or more basic alkali metal compounds are also suitable.

In stage (I) of the process according to the invention, the starter or starters is or are reacted with alkylene oxide at a catalyst concentration of not more than 0.0085 mol of basic catalyst per mole of starter, preferably of not more than 0.0066 mol of basic catalyst per mole of starter, particularly preferably of not more than 0.005 mol of basic catalyst per mole of starter, very particularly preferably of not more than 0.00415 mol of basic catalyst per mole of starter and more preferably 0.00332 mol of basic catalyst per mole of starter.

In stage (I) of the process according to the invention, the starter or starters is or are reacted with from 3 to 10, preferably from 4 to 8, particularly preferably from 5 to 7, mol of alkylene oxide per mole of starter.

In one embodiment of the present invention, stage (I) of the process according to the invention is carried out at reaction temperatures of from 110° C. to 180° C., preferably from 120° C. to 170° C., particularly preferably from 130° C. to 160° C.

In one embodiment of the present invention, stage (I) of the process according to the invention is carried out at atmospheric pressure (1 bar). In another embodiment of the present invention, stage (I) of the process according to the invention is carried out at superatmospheric pressure, for example at from 1.01 to 20 bar.

After stage (I) of the process according to the invention has been carried out, alkoxylated starter, also referred to as starter alkoxylate in the context of the present invention, is obtained.

The starter alkoxylate from stage (I) is then reacted, according to the invention, in at least one further stage, for example in stage (II), with further alkylene oxide, which may be different from or preferably identical to alkylene oxide from stage (I), under basic catalysis, the catalyst concentration in the starter alkoxylate from stage (I) being increased to values of at least 0.010 mol of basic catalyst per mole of starter alkoxylate, preferably at least 0.015 mol of basic catalyst per mole of starter alkoxylate, particularly preferably at least 0.020 mol of basic catalyst per mole of starter alkoxylate.

Starter alkoxylate from stage (I) is reacted with from 3 to 200, preferably from 7 to 160, particularly preferably from 10 to 140, mol of alkylene oxide per mole of starter alkoxylate.

In one embodiment of the present invention, stage (II) and the optionally following stage(s) of the process according to the invention are carried out at reaction temperatures of from 110° C. to 180° C., preferably from 120° C. to 170° C., particularly preferably from 130° C. to 160° C.

In one embodiment of the present invention, stage (II) and the optionally following stage(s) of the process according to the invention are carried out at atmospheric pressure. In another embodiment of the present invention, stage (II) and the optionally following stages of the process according to the invention are carried out at superatmospheric pressure, for example at from 1.01 to 10 bar.

It is found that the onset temperature of the exothermic secondary reaction can be increased to values of above 285° C., preferably above 290° C., particularly preferably above 300° C., especially preferably above 310° C., by the catalyst concentration in step (I). However, these very low catalyst concentrations lead to a greatly reduced reaction rate, which may be economically prohibitive for the process.

In one embodiment of the present invention, altogether at least 0.015 mol of basic catalyst is added per mole of starter.

The inventive multistage character of the alkoxylation can be realized in various embodiments.

One of the embodiments is to react the starter with alkylene oxide at the low concentration of catalyst in a first stage, then subsequently to meter catalyst into the reactor and to react the mixture present in the reactor further with alkylene oxide.

In one variant of this embodiment, the first stage of the reaction and optionally a part of the following stage are carried out in one reactor and the reaction mixture is then transferred to another reactor in which the remainder of the following stage is carried out.

In another embodiment, the stage (I) of the process according to the invention is carried out in one reactor. The intermediate product obtained, the starter alkoxylate, is then transferred to another vessel, for example a tank, and stored there. For carrying out the second stage, the starter alkoxylate temporarily stored in another vessel is then initially taken as fresh starter in the reactor and the following stage (II) and optionally further stages of the process according to the invention are carried out. If required, the product from stage (II), too, will be transferred to another vessel, for example to a tank, and will be stored there and will serve as starter for the reaction in a third stage.

This means that the two or more stages of the reaction can take place in the same reactor but need not necessarily do so.

The present invention furthermore relates to polyether alcohols obtainable by the process according to the invention. Polyether alcohols according to the invention are distinguished by improved purity.

The present invention furthermore relates to the use of polyether alcohols according to the invention as, or for the preparation of, flow improvers for construction materials, for example concrete.

The following examples explain the invention in more detail but without limiting it.

Basic catalyst is often also referred to as base for short.

The hydroxyl number was determined in each case according to DIN 53240. Pressure data in mbar or bar always relate to the absolute pressure.

Comparative Examples 1-4

In an apparatus for measurement of dynamic differential calorimetry (Mettler TA 8000), the amount of 4-hydroxybutyl vinyl ether (HBVE) stated in table 1, which comprised that concentration of basic catalyst which is stated in table 1, was heated in a V4A crucible under a nitrogen atmosphere at a heating rate of 2.5 K/min. The onset temperatures and liberated quantities of heat stated in table 1 were found.

TABLE 1

Onset temperatures of HBVE with basic catalyst

| Mass of HBVE [mg] | Basic catalyst | Concentration of base [mole of base per mole of HBVE] | Onset temperature [° C.] | Liberated quantity of heat [J/g] |
|---|---|---|---|---|
| 23.7 | Potassium methanolate | 0.098 | 170 | 340 |
| 27.3 | Sodium methanolate | 0.093 | 180 | 320 |
| 24.1 | Sodium hydroxide | 0.091 | 185 | 350 |
| 28.7 | Potassium hydroxide | 0.074 | 170 | 580 |

Example 5-8

In an apparatus for measurement of dynamic differential calorimetry (Mettler TA 8000), the amount of 4-hydroxybutyl vinyl ether (HBVE) or HBVE ethoxylate (HBVE+5 EO) stated in table 2, which comprised as basic catalyst that concentration of potassium methanolate which is stated in table 2, was heated in a V4A crucible under a nitrogen atmosphere at a heating rate of 2.5 K/min. The onset temperatures and liberated quantities of heat stated in table 2 were found.

TABLE 2

Onset temperatures of HBVE or HBVE + 5 EO with basic catalyst

| Substance | Mass weighed in [mg] | Concentration of base [mole of base per mole of HBVE] | Onset temperature [° C.] | Liberated quantity of heat [J/g] |
|---|---|---|---|---|
| HBVE | 19.8 | 0.0017 | 310 | 380 |
| HBVE | 21.8 | 0.0033 | 305 | 490 |
| HBVE | 21.5 | 0.0066 | 295 | 510 |
| HBVE + 5 EO | 28.7 | 0.0912 | 295 | 690 |

EO: ethylene oxide

Example 9

Preparation of HBVE+22 EO with Potassium Methanolate as Catalyst 71.3 g of 4-hydroxybutyl vinyl ether (HBVE) and 0.45 g of potassium methanolate solution (32% by weight of potassium methanolate in methanol) were initially taken in a 1 liter reactor (0.0033 mol of base/mole of HBVE).

The 1 liter reactor was heated to 80° C. Thereafter, the 1 liter reactor was evacuated to 50 mbar and the vacuum was broken with nitrogen. The evacuation and breaking of the vacuum with nitrogen were repeated three times. Thereafter, the 1 liter reactor was heated to 140° C. and nitrogen was forced in to a pressure of 1.5 bar.

135.2 g of ethylene oxide were passed at 140° C. into the reactor blanketed in this manner. After a reaction time of 30 min, the 1 liter reactor was cooled to 80° C. and 2.95 g of potassium methanolate solution (32% by weight of potassium methanolate in methanol) were added (altogether: 0.025 mol of base/mole of HBVE).

Thereafter, the 1 liter reactor was evacuated to 50 mbar and the vacuum was broken with nitrogen. The evacuation and breaking of the vacuum with nitrogen were repeated three times.

Thereafter, the 1 liter reactor was heated to 140° C. and nitrogen was forced in to 1.5 bar.

At 140° C., a further 460.8 g of ethylene oxide were then passed into the reactor. After a postreaction time of 30 min, the 1 liter reactor was cooled to 80° C. and let down. PEA-9 prepared according to the invention was obtained. 67 mg of para-tert-butylcatechol were then added in order to stabilize the PEA-9.

The hydroxyl number of PEA-9 was 51.4 mg KOH/g and the kinematic viscosity was 62.5 mm$^2$/s (at 50° C.).

Example 10

Preparation of HBVE+22 EO with Sodium Methanolate as Catalyst 71.3 g of 4-hydroxybutyl vinyl ether and 0.48 g of sodium methanolate solution (30% by weight of sodium methanolate in methanol) were initially taken in a 1 liter reactor (0.0043 mol of base/mole of HBVE).

The 1 liter reactor was heated to 80° C. Thereafter, the 1 liter reactor was evacuated to 50 mbar and the vacuum was broken with nitrogen. The evacuation and breaking of the vacuum with nitrogen were repeated three times. Thereafter, the 1 liter reactor was heated to 140° C. and nitrogen was forced in to a pressure of 1.5 bar.

135.2 g of ethylene oxide were passed at 140° C. into the reactor blanketed in this manner. After a reaction time of 30 min, the 1 liter reactor was cooled to 80° C. and 2.32 g of sodium methanolate (30% by weight of sodium in methanol) were added (altogether: 0.025 mol of base/mole of HBVE).

Thereafter, the 1 liter reactor was evacuated to 50 mbar and the vacuum was broken with nitrogen. The evacuation and breaking of the vacuum with nitrogen were repeated three times.

Thereafter, the 1 liter reactor was heated to 140° C. and nitrogen was forced in to 1.5 bar.

At 140° C., a further 460.8 g of ethylene oxide were then passed into the reactor. After a postreaction time of 30 min, the 1 liter reactor was cooled to 80° C. and let down. PEA-10 prepared according to the invention was obtained. 67 mg of para-tert-butyl-catechol were then added in order to stabilize the PEA-10.

The hydroxyl number of PEA-10 was 51.0 mg KOH/g and the kinematic viscosity was 63.0 mm$^2$/s (at 50° C.).

Example 11

Preparation of HBVE+5 EO According to Stage (I) of the Process According to the Invention (Stage (I) Located Externally)

231 g of 4-hydroxybutyl vinyl ether and 1.44 g of potassium methanolate solution (32% by weight of potassium methanolate in methanol) were initially taken in a 1 liter reactor (0.0033 mol of base/mole of HBVE).

The 1 liter reactor was heated to 80° C. Thereafter, the 1 liter reactor was evacuated to 50 mbar and the vacuum was broken with nitrogen. The evacuation and breaking of the vacuum with nitrogen were repeated three times.

Thereafter, the 1 liter reactor was heated to 140° C. and nitrogen was forced in to a pressure of 1.5 bar.

439 g of ethylene oxide were passed at 140° C. into the 1 liter reactor blanketed in this manner. After a reaction time of 30 min, the 1 liter reactor was cooled to 80° C. and let down and the PEA-11 thus obtainable was discharged.

The hydroxyl number of PEA-11 was 166.9 mg KOH/g.

Example 12

Preparation of HBVE+22 EO 206 g of PEA-11 were initially taken in a 1 liter reactor and 2.95 g of potassium methanolate solution (32% by weight of potassium methanolate in methanol) were added (altogether: 0.025 mol of base/mole of HBVE).

The 1 liter reactor was heated to 80° C. Thereafter, the 1 liter reactor was evacuated to 50 mbar and the vacuum was broken with nitrogen. The evacuation and breaking of the vacuum with nitrogen were repeated three times. Thereafter, the 1 liter reactor was heated to 140° C. and nitrogen was forced in to a pressure of 1.5 bar.

464 g of ethylene oxide were passed at 140° C. into the 1 liter reactor blanketed in this manner. After a postreaction time of 30 min, the 1 liter reactor was cooled to 80° C. and let down. PEA-12 prepared according to the invention was obtained. 67 mg of para-tert-butylcatechol were then added in order to stabilize the PEA-12.

The hydroxyl number of PEA-12 was 51.2 mg KOH/g and the kinematic viscosity was 62.7 mm$^2$/s (at 50° C.).

Example 13

Preparation of HBVE+5 EO According to Stage (I) of the Process According to the Invention (Stage (I) Located Externally)

231 g of 4-hydroxybutyl vinyl ether and 1.54 g of sodium methanolate solution (30% by weight of sodium methanolate in methanol) were initially taken in a 1 liter reactor (0.0043 mole of base/mole of HBVE).

The 1 liter reactor was heated to 80° C. Thereafter, the 1 liter reactor was evacuated to 50 mbar and the vacuum was broken with nitrogen. The evacuation and breaking of the vacuum with nitrogen were repeated three times.

Thereafter, the 1 liter reactor was heated to 140° C. and nitrogen was forced in to a pressure of 1.5 bar.

439 g of ethylene oxide were passed at 140° C. into the 1 liter reactor blanketed in this manner. After a reaction time of 30 min, the 1 liter reactor was cooled to 80° C. and let down and the PEA-13 thus prepared was discharged.

The hydroxyl number of PEA-13 was 167.1 mg KOH/g.

Example 14

Preparation of HBVE+22 EO 206 g of PEA-13 were initially taken in a 1 liter reactor and 2.32 g of sodium methanolate solution (30% by weight of sodium methanolate in methanol) were added (altogether: 0.025 mol of base/mole of HBVE).

The 1 liter reactor was heated to 80° C. Thereafter, the 1 liter reactor was evacuated to 50 mbar and the vacuum was broken with nitrogen. The evacuation and breaking of the vacuum with nitrogen were repeated three times.

Thereafter, the 1 liter reactor was heated to 140° C. and nitrogen was forced in to a pressure of 1.5 bar.

464 g of ethylene oxide were passed at 140° C. into the 1 liter reactor blanketed in this manner.

After a postreaction time of 30 min, the 1 liter reactor was cooled to 80° C. and let down. PEA-14 prepared according to the invention was obtained. 67 mg of para-tert-butyl-catechol were then added in order to stabilize PEA-14.

The hydroxyl number of PEA-14 was 52.0 mg KOH/g and the kinematic viscosity was 61.9 mm$^2$/s (at 50° C.).

Example 15

Preparation of HBVE+27 EO (Stage (II), Located Externally)

172 g of PEA-11 and 9.64 g of potassium methanolate solution (32% by weight of potassium methanolate in methanol) were initially taken in a 1 liter reactor (0.0861 mol of base/mole of HBVE). The 1 liter reactor was heated to 80° C. Thereafter, the 1 liter reactor was evacuated to 50 mbar and the vacuum was broken with nitrogen. The evacuation and breaking of the vacuum with nitrogen were repeated three times.

Thereafter, the 1 liter reactor was heated to 140° C. and nitrogen was forced in to a pressure of 1.5 bar.

498 g of ethylene oxide were passed at 140° C. into the 1 liter reactor blanketed in this manner. After a reaction time of 30 min, the 1 liter reactor was cooled to 80° C. and let down and the PEA-15 thus prepared was discharged.

The hydroxyl number of PEA-15 was 42.8 mg KOH/g.

Example 16

Preparation of HBVE+128 EO (Stage (III))

151 g of PEA-15 (0.0861 mol of base/mole of HBVE) were initially taken in a 1 liter reactor.

The 1 liter reactor was heated to 80° C. Thereafter, the 1 liter reactor was evacuated to 50 mbar and the vacuum was broken with nitrogen. The evacuation and breaking of the vacuum with nitrogen were repeated three times.

Thereafter, the 1 liter reactor was heated to 140° C. nitrogen was forced in to a pressure of 1.5 bar.

519 g of ethylene oxide were passed at 140° C. into the 1 liter reactor blanketed in this manner.

After a reaction time of 60 min, the 1 liter reactor was cooled to 80° C. and let down. PEA-16 prepared according to the invention was obtained. 67 mg of para-tert-butyl-catechol were then added in order to stabilize PEA-16.

The hydroxyl number of PEA-16 was 10.1 mg KOH/g and the kinematic viscosity was 530 mm$^2$/s (at 80° C.).

Example 17

Preparation of HBVE+27 EO (Stage (II), Located Externally)

172 g of PEA-13 and 7.93 g of sodium methanolate solution (30% by weight of sodium methanolate in methanol) were initially taken in a 1 liter reactor (0.0861 mol of base/mole of HBVE). The 1 liter reactor was heated to 80° C. Thereafter, the 1 liter reactor was evacuated to 50 mbar and the vacuum was broken with nitrogen. The evacuation and breaking of the vacuum with nitrogen were repeated three times.

Thereafter, the 1 liter reactor was heated to 140° C. and nitrogen was forced in to a pressure of 1.5 bar.

498 g of ethylene oxide were passed at 140° C. into the 1 liter reactor blanketed in this manner. After a reaction time of 30 min, the 1 liter reactor was cooled to 80° C. and let down and the PEA-17 obtainable in this manner and prepared according to the invention was discharged.

The hydroxyl number of PEA-17 was 43.1 mg KOH/g.

Example 18

Preparation of HBVE+128 EO 151 g of PEA-17 were initially taken in a 1 liter reactor (0.0861 mol of base/mole of HBVE).

The 1 liter reactor was heated to 80° C. Thereafter, the 1 liter reactor was evacuated to 50 mbar and the vacuum was broken with nitrogen. The evacuation and breaking of the vacuum with nitrogen were repeated three times.

Thereafter, the 1 liter reactor was heated to 140° C. and nitrogen was forced in to a pressure of 1.5 bar.

519 g of ethylene oxide were passed at 140° C. into the 1 liter reactor blanketed in this manner.

After a reaction time of 60 min, the 1 liter reactor was cooled to 80° C. and let down. PEA-18 prepared according to the invention was obtained. 67 mg of para-tert-butyl-catechol were then added in order to stabilize PEA-18.

The hydroxyl number of PEA-18 was 9.7 mg KOH/g and the kinematic viscosity was 550 mm$^2$/s (at 80° C.).

Example 19

Preparation of HBVE+128 EO 172 g of PEA-11 and 9.64 g of potassium methanolate solution (32% by weight of potassium methanolate in methanol) were initially taken in a 1 liter reactor (0.0861 mol of base/mole of HBVE).

The 1 liter reactor was heated to 80° C. Thereafter, the 1 liter reactor was evacuated to 50 mbar and the vacuum was broken with nitrogen. The evacuation and breaking of the vacuum with nitrogen were repeated three times.

Thereafter, the 1 liter reactor was heated to 140° C. and nitrogen was forced in to a pressure of 1.5 bar.

498 g of ethylene oxide were passed at 140° C. into the 1 liter reactor blanketed in this manner. After a reaction time of 30 min, the product was forced from the 1 liter reactor into a 5 liter reactor.

Thereafter, the 5 liter reactor was heated to 140° C. and nitrogen was forced in to 1.5 bar. 2283 g of ethylene oxide were passed at 140° C. into the 5 liter reactor blanketed in this manner.

After a reaction time of 60 min, the 5 liter reactor was cooled to 80° C. and let down. PEA-19 prepared according to the invention was obtained. 67 mg of para-tert-butyl-catechol were then added in order to stabilize PEA-19.

The hydroxyl number of PEA-19 was 10.3 mg KOH/g and the kinematic viscosity was 510 mm$^2$/s (at 80° C.).

Example 20

Preparation of HBVE+128 EO (Stage (II) (HBVE+27 EO), Located Externally)

172 g of PEA-13 and 7.93 g of sodium methanolate solution (30% by weight of sodium methanolate in methanol) were initially taken in a 1 liter reactor (0.0861 mol of base/mole of HBVE). The 1 liter reactor was heated to 80° C. Thereafter, the 1 liter reactor was evacuated to 50 mbar and the vacuum was broken with nitrogen. The evacuation and breaking of the vacuum with nitrogen were repeated three times.

Thereafter, the 1 liter reactor was heated to 140° C. and nitrogen was forced in to a pressure of 1.5 bar.

498 g of ethylene oxide were passed at 140° C. into the 1 liter reactor blanketed in this manner.

After a reaction time of 30 min, the product was forced from the 1 liter reactor into a 5 liter reactor.

Thereafter, the 5 liter reactor was heated to 140° C. and nitrogen was forced in to 1.5 bar. 2283 g of ethylene oxide were passed at 140° C. into the 5 liter reactor blanketed in this manner.

After a reaction time of 60 min, the 5 liter reactor was cooled to 80° C. and let down. PEA-20 prepared according to the invention was obtained. 67 mg of para-tert-butyl-catechol were then added in order to stabilize PEA-20.

The hydroxyl number of PEA-20 was 9.9 mg KOH/g and the kinematic viscosity was 540 mm$^2$/s (at 80° C.). Abstract Process for the preparation of polyether alcohols from unsaturated starters having active hydrogen atoms A process for the preparation of polyether alcohols by reacting at least one alkylene oxide with at least one unsaturated starter having at least one active hydrogen atom per molecule under basic catalysis, that the alkoxylation is carried out in at least two stages, in stage (I) the alkoxylation of the starter or starters being carried out with not more than 10 mol of alkylene oxide per mole of starter with a catalyst concentration of not more than 0.0085 mol of basic catalyst per mole and in stage (II) and the optionally following stages, the alkoxylated starter or starters from stage (I) being reacted with further alkylene oxide at a catalyst concentration of at least 0.01 mol of basic catalyst per mole of starter.

We claim:

1. A process for preparing a polyether alcohol under basic catalysis, the process comprising:
   (I) conducting a first alkoxylation of an unsaturated starter, comprising at least one active hydrogen atom per molecule, with not more than 10 mol of an alkylene oxide per mole of the starter with a catalyst concentration of not more than 0.0085 mol of basic catalyst per mole of starter, to obtain an alkoxylated starter; and
   (II) alkoxylating the alkoxylated starter from (I) with further alkylene oxide at a catalyst concentration of at least 0.01 mol of basic catalyst per mole of starter.

2. The process of claim 1, wherein the starter comprises an allyl or vinyl group.

3. The process of claim 1, wherein the starter comprises a vinyl ether alcohol.

4. The process of claim 1, wherein the starter is 4-hydroxybutyl vinyl ether.

5. The process of claim 1, wherein the alkylene oxide comprises at least one of ethylene oxide and propylene oxide.

6. The process of claim 1, wherein the basic catalyst comprises at least one of sodium hydroxide, potassium hydroxide, sodium alcoholate, and potassium alcoholate.

7. The process of claim 1, wherein a mixture of the basic catalyst with the starter has an onset temperature of not more than 285° C.

8. The process of claim 1, wherein altogether at least 0.015 mol of basic catalyst per mole of starter is added.

9. The process of claim 1, wherein, in (I), the alkoxylation is carried out with a catalyst concentration of not more than 0.00415 mol of basic catalyst per mole of the starter.

10. The process of claim 1, wherein, in (II), the alkoxylated starter is reacted with further alkylene oxide at a catalyst concentration of at least 0.015 mol of basic catalyst per mole of the starter.

11. The process of claim 1, wherein, in (I), the alkoxylation is carried out with 5 to 7 mol of alkylene oxide per mole of starter.

12. The process of claim 1, wherein the starter is of formula (I)

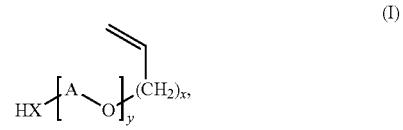

wherein
X is N—H or oxygen,
x is 0, 1, 2, 3, or 4,
y is 0 or 1,
wherein at least one of x and y is not 0,
A is a branched or linear $C_2$-$C_{10}$-alkylene group.

13. The process of claim 12, wherein y is 1 and A is $CH(CH_3)$—$CH_2$ or $[CH(CH_3)]_2$.

14. The process of claim 12, wherein y is 1 and A is a linear $C_2$-$C_6$-alkylene.

15. The process of claim 12, wherein y is 1 and A is a (poly)alkylene oxide.

16. The process of claim 1, wherein the starter comprises at least one of allyl alcohol, 2-hydroxyethyl vinyl ether, 3-hydroxypropyl vinyl ether, 4-hydroxybutyl vinyl ether, 5-hydroxypentyl vinyl ether, 6-hydroxyhexyl vinyl ether, diethylene glycol monovinyl ether, triethylene glycol monovinyl ether, and 3-aminopropyl vinyl ether.

17. The process of claim 12, wherein the starter comprises:
10% by weight of the compound of formula (I),
up to 90% by weight of an alcohol or an amine without an ethylenic double bond,
wherein the alcohol or amine without the ethylenic double bond is present.

18. The process of claim 12, wherein x is 0 or 1.

19. The process of claim 12, wherein x is 2, 3, or 4.

20. The process of claim 1, wherein, in (I), the alkoxylation is carried out with a catalyst concentration of not more than 0.00332 mol of basic catalyst per mole of the starter.

* * * * *